United States Patent
Wheeler

(10) Patent No.: US 10,536,832 B2
(45) Date of Patent: Jan. 14, 2020

(54) NETWORK DETECTION FOR CONTENT SYNCHRONIZATION AND REPORTING

(71) Applicant: Glen Wheeler, Tampa, FL (US)

(72) Inventor: Glen Wheeler, Tampa, FL (US)

( * ) Notice: Subject to any disclaimer, the term of this patent is extended or adjusted under 35 U.S.C. 154(b) by 0 days.

(21) Appl. No.: 16/247,506

(22) Filed: Jan. 14, 2019

(65) Prior Publication Data
US 2019/0149966 A1 May 16, 2019

Related U.S. Application Data

(60) Division of application No. 16/162,312, filed on Oct. 16, 2018, now abandoned, which is a continuation of application No. 15/785,367, filed on Oct. 16, 2017, now Pat. No. 10,154,396.

(51) Int. Cl.
| | |
|---|---|
| *H04M 3/493* | (2006.01) |
| *H04W 4/60* | (2018.01) |
| *H04W 48/16* | (2009.01) |
| *H04W 4/02* | (2018.01) |
| *H04W 4/50* | (2018.01) |
| *H04W 88/02* | (2009.01) |

(52) U.S. Cl.
CPC .............. *H04W 4/60* (2018.02); *H04W 4/023* (2013.01); *H04W 4/50* (2018.02); *H04W 48/16* (2013.01); *H04W 88/02* (2013.01)

(58) Field of Classification Search
USPC ........... 455/456.1, 456.2, 434, 513; 370/401, 370/235; 705/5
See application file for complete search history.

(56) References Cited

U.S. PATENT DOCUMENTS

| | | | | |
|---|---|---|---|---|
| 8,750,123 | B1* | 6/2014 | Alisawi | H04W 28/0284 370/235 |
| 2014/0080533 | A1* | 3/2014 | Tabrizi | H04W 72/08 455/513 |
| 2014/0274136 | A1* | 9/2014 | Edge | H04W 4/029 455/456.2 |
| 2015/0088561 | A1* | 3/2015 | Charles | G06Q 10/02 705/5 |
| 2015/0141005 | A1* | 5/2015 | Suryavanshi | H04L 67/125 455/434 |
| 2015/0172118 | A1* | 6/2015 | Lin | H04L 41/0806 370/401 |
| 2016/0057651 | A1* | 2/2016 | Backholm | H04W 28/0284 370/235 |

(Continued)

*Primary Examiner* — David Q Nguyen
(74) *Attorney, Agent, or Firm* — Justin Luby

(57) ABSTRACT

The present invention utilizes an application which is loaded onto the mobile devices of attendees who will be attending festivals, concerts, etc, where the large crowds attending the event will create wireless and mobile network congestion. The application will be preloaded with a plurality of presentations which the presenter will utilize during the event to enhance the experience for the attendee. Each presentation will have a triggering mechanism encoded in the app which will initiate the presentation to begin and will synchronize the presentation on the phone with event. In addition to displaying preloaded presentations to the attendees at crowded events, the application can also track the activities of the attendees at the event to see what portions of the events they attended and when, and display real time text messages on the screen of the phone.

4 Claims, 4 Drawing Sheets

(56) References Cited

U.S. PATENT DOCUMENTS

2016/0142873 A1\* 5/2016 Trivedi ................ H04W 4/021
                                                                                            455/456.1
2018/0255479 A1\* 9/2018 Markham ............. H04W 24/08

\* cited by examiner

NETWORK DETECTION FOR CONTENT SYNCHRONIZATION AND REPORTING

CROSS-REFERENCE TO RELATED APPLICATIONS

This application claims priority to application U.S. Ser. No. 16/162,312 filed Oct. 16, 2018. Said application is incorporated by reference herein in its entirety.

FIELD OF THE INVENTION

The present invention relates generally to wireless networking and more specifically communication between networks and mobile devices.

BACKGROUND

When a large number of wireless devices are located in close proximity to each other, congestion will occur in the networks servicing these devices, and the effectiveness of these devices to receive data will be severely limited, limiting the functionality of these devices.

Network congestion is a common occurrence at largely attended events such as concerts and sporting events. The large number of mobile devices located in the confines of the venues for these events, coupled with the tendency of people to post pictures to social media while they are at these events, as well live stream the events from their mobile devices, requires bandwidth which exceeds what the cellular networks can provide.

Wireless network providers have created a number of strategies to alleviate the congestion issues at these heavily attended events, such as the deployment of mobile cell sites, rapid deployment units (RDUs), cells on wheels (COWs) and cells on truck (COTs). These types of devices help alleviate network congestion, but typically are more effective at providing functionality to lower bandwidth activities, such as texting and voice calls, than activities which require a larger amount of network bandwidth, such as transmitting photographs and live streaming.

Large venues which host these types of crowded events, such as stadiums, regularly can most effectively combat this network congestion through the installation of a WI-FI network at the venue which offers an alternative method of providing wireless data to mobile devices. However, even the most sophisticated WI-FI networks at these venues will have difficulty supporting live streaming data to or from thousands of mobile devices simultaneously.

The limitation of being able to live-stream presentations to mobile devices during largely attended events such as concerts, limits the ability of the presenter to communicate all media to the viewer that he may wish to.

During concerts, there may be media, such as music videos which are synchronized to the music, which could enhance the experience for the attender. At a large venue, such as an arena or stadium, this synchronized media could be presented via large screen viewing devices such as a jumbo Tron or the like.

Todays technology would enable this type of presentation through the transmission of a VHF or UHF transmitter, if the attendees had receivers for these types of transmissions. However, the typical mobile device used today, the smartphone, does not have VHF or UHF receivers incorporated into the device. If presenters wished to utilize this technology, they would need to provide attendees with devices which could receive this type of transmission, which would be costly to procure, and would likely lead to additional costs in damaged or stolen equipment.

However, with the current limitations on today's networks to simultaneously stream this much data to thousands of personal mobile devices simultaneously, this type of presentation is not feasible.

Thus, there exists a need for a method to provide synchronized media presentations on a multitude of personal mobile devices in large crowded areas where network congestion would otherwise prevent the transmission of these presentations to the attendees.

SUMMARY

To accomplish this objective, the method of the present invention utilizes an application which is loaded onto the mobile devices of attendees who will be attending festivals, concerts, etc, where the large crowds attending the event will create network congestion. The application will be preloaded with a plurality of presentations which the presenter will utilize during the event to enhance the experience for the attendee. Each presentation will have a triggering mechanism encoded in the application which will initiate the presentation to begin and will synchronize the presentation on the device with the live presentation.

During the event, the presenter will emit signals from a transmitter which will activate the individual presentations preloaded into the applications. The transmission will include a timestamp which will provide the mobile device the time at which the presentation began transmitting. The mobile device will then compare the timestamp with the world clock time to synchronize the preloaded presentation with the real-time presentation occurring at the event.

The transmission signal which will trigger the individual presentations on the applications could be a WI-FI transmitter. The WI-FI mobile devices will not actually connect to the WI-FI network, but the broadcast name of the WI-FI device will include coded information such as the file name of the preloaded application as well as a timestamp representing the time the presentation started. When the mobile devices are in range of the WI-FI signal, the application will see the signal and will open the file and synchronize the presentation based on the timestamp.

Because the mobile devices are not actually connecting to the WI-FI network, network congestion will not be a factor in hampering the ability of the attendees to view the presentation.

In addition to displaying synchronized preloaded presentations to the attendees at crowded events, the application can also track the activities of the attendees at the event to see what portions of the events they attended and when.

Many large crowded events, such as music festivals, have multiple events going on simultaneously, such as several stages with different music acts playing simultaneously. Additionally, these events also have booths with vendors selling goods or marketing other products.

WI-FI transmitters have a limited range, and can be adjusted to limit the range of the signal transmitted. In this way, the event stagers can set up a multitude of WI-FI transmitters throughout the event adjusted to only provide signal within the designed confines of a stage, booth, etc. Each transmitter will have an unique network name identifying where it is located throughout the venue.

The application will be designed as such that in addition to displaying preloaded presentations, the application will also track the time that the application is in range of the various WI-FI transmitters at the various stages and booths.

After the event, once the attendee leaves the crowded area and resumes normal network connectivity, this information will be transferred from the personal device, back to a central server, where this information can be used for market research.

DETAILED DESCRIPTION OF THE INVENTION

Communication systems for distributing a presentation 100 to mobile devices utilizing four primary components, Controlling Station 101, an Emitting Station 102, at least one Mobile Receiving Device 103 with a Screen, and Application Software 104 loaded on the Mobile Receiving Device(s) 103.

Figure 1:
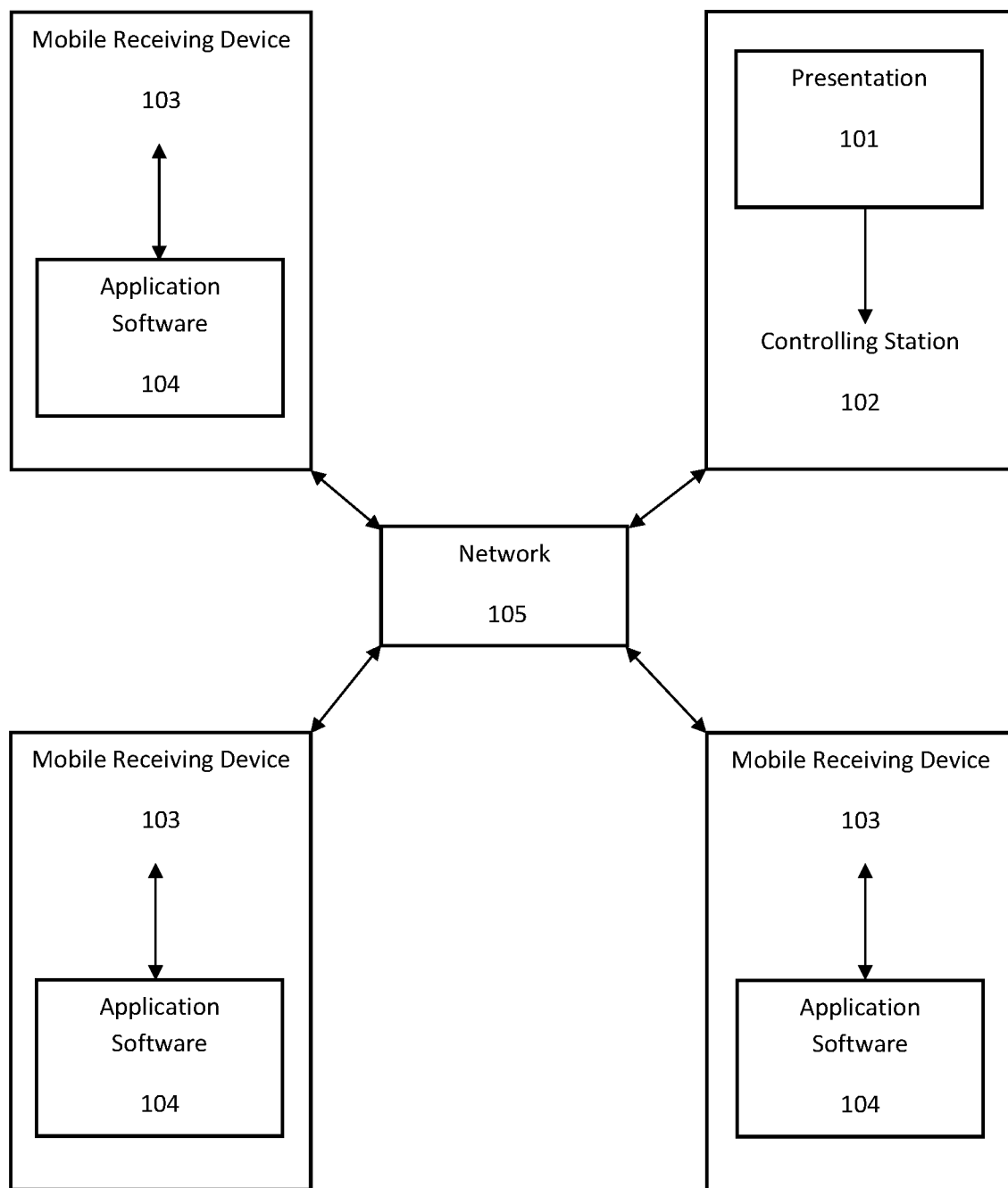
FIG. 1 illustrates a schematic of the prior art communication system, using a two way communication system to stream a presentation to multiple mobile devices.

Referring to FIG. 1, conventional communication system for distributing a presentation to a Mobile Receiving Device 103 via a wireless signal from the Network 105, in the form of a wireless access point, require the Mobile Receiving Device 103 to attach to a wireless network 105, negotiate a common communication protocol and begin two-way communication of data. In the conventional method, the Mobile Receiving Device 103 will contain an application 104 which is loaded on the device. The Controlling Station 102 will communicate the presentation to the Mobile Receiving Devices 103 via the Wireless Network 105 in the form of Data. The Mobile Receiving Device 103 will have an application 104 loaded onto the device which is capable of converting that data into a viewable presentation on the screen of the Mobile Receiving Device 103. The receiving device 103 is required to maintain two way communication with the Wireless Network 105 in order for the application to work properly.

The Application 104 loaded on the Mobile Receiving Device 103 can merely transform the data into viewable form on the device, and the data is not required to be stored on the device. This method of Data Transfer minimizes the amount of data which needs to be stored on the Mobile Receiving Device 103 to view the presentation, conserving storage on the Mobile Receiving Device 103.

Transferring the amount of data necessary to stream a presentation to thousands of event attendees simultaneously using two-way communication is not feasible using the technology today, including Wi-Fi, Cellular Networks, and short-wavelength UHF radio waves. These networks have bandwidth limitations which cannot support two way communications with thousands of devices simultaneously. The primary limitation of the conventional communication systems of FIG. 1, is that a wireless access point can only have a finite number of Mobile Receiving Devices 103 connected to the wireless access point at a given time, which limits the effectiveness of this type of communication in an confined area with a large number of users attempting to connect to the communication system simultaneously.

Figure 2:
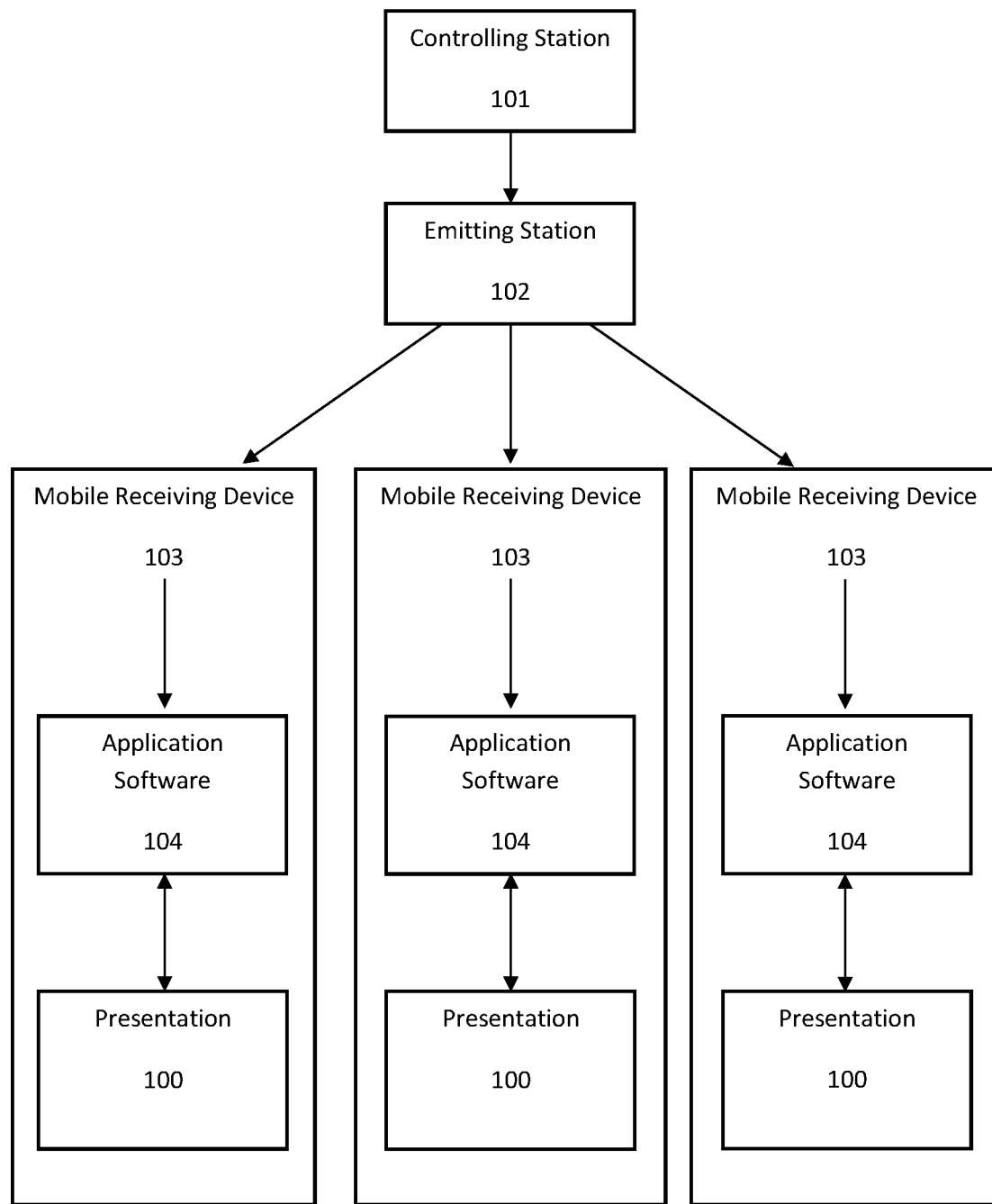
FIG. 2 illustrates a schematic of the communication system of the current invention, using a one-way system to stream a presentation to multiple mobile devices.
Figure 3:
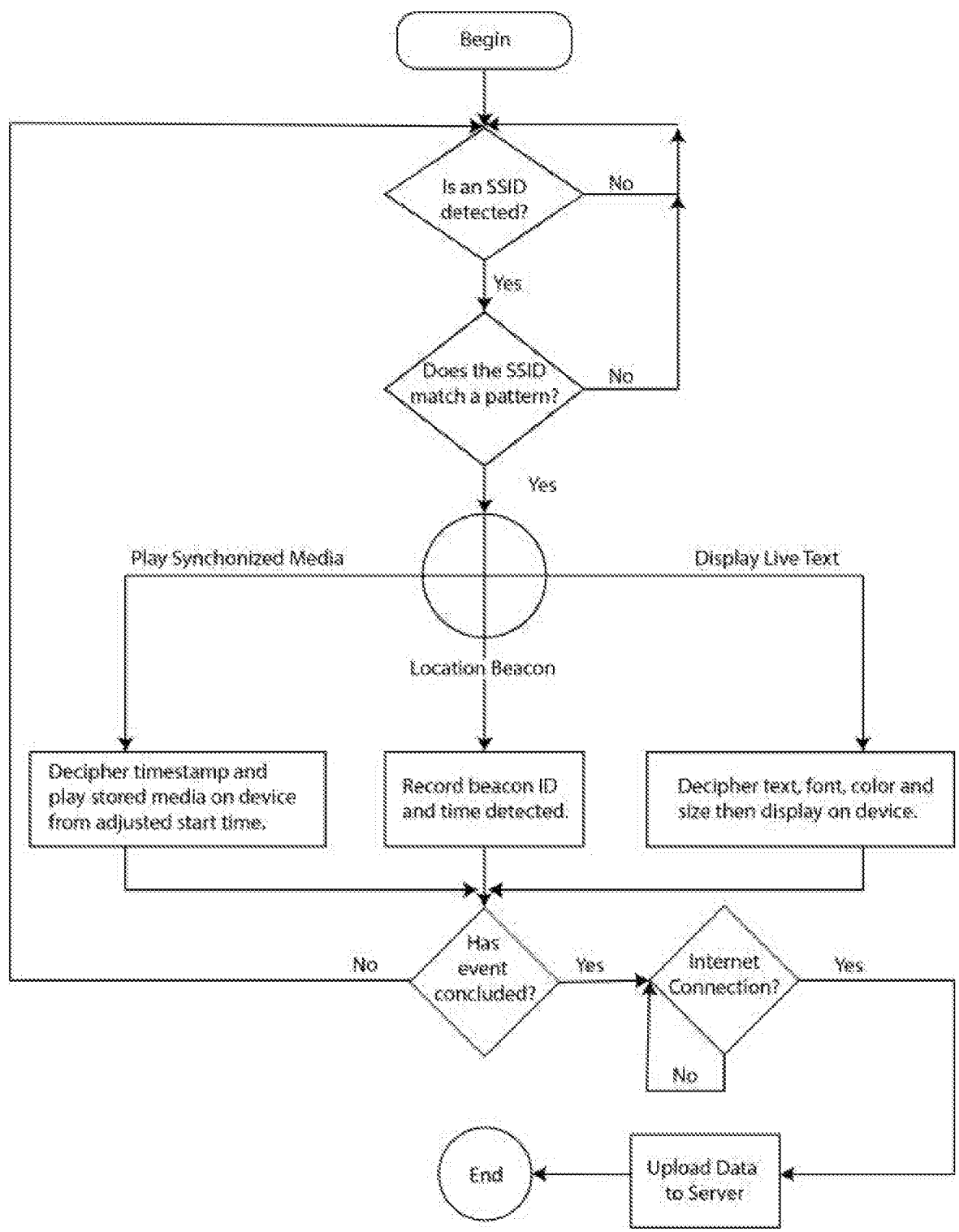
FIG. 3 illustrates a flow chart, depicting the operation of the system for activating media content loaded on the mobile device, tracking the device, and displaying text on the screen of the device.
Figure 4:
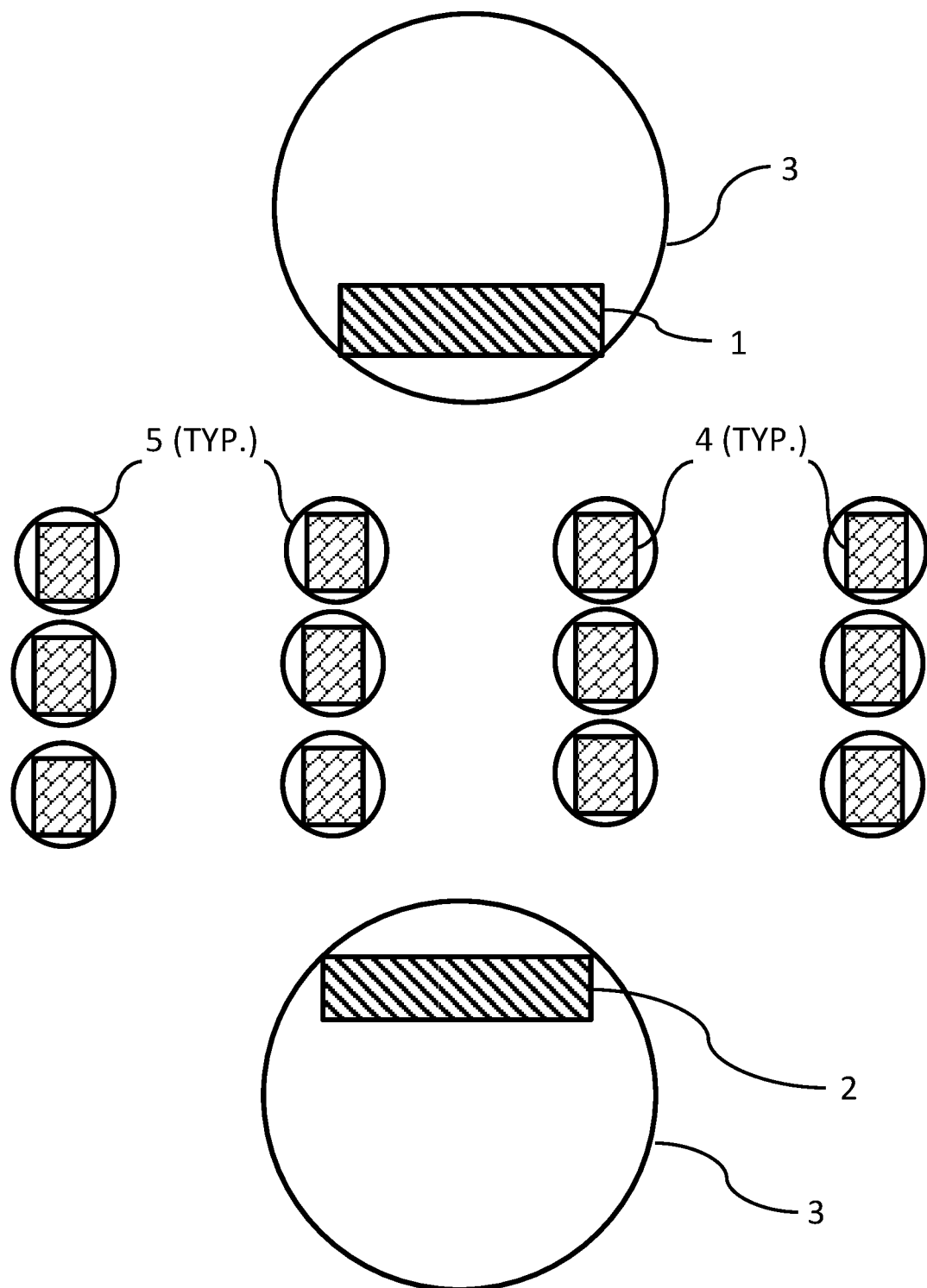
FIG. 4 illustrates an arrangement of a festival concert, and how the emitting devices could be arranged to successfully operate the communication system of the current invention.

Referring to FIG. 2, the communication system of the current invention provides an alternative means for distributing information to mobile devices via a wireless signal without establishing or requiring a network. This new method negates the need for two way communication. It also bypasses the need to negotiate a common protocol or attach to a network. Because the communication is one-way and not two-way, there is no limitation on the network for the number of devices it can support.

In the preferred embodiment the Emitting Station 102 is a device capable of emitting an IEEE 802.11x (Wi-Fi) signal and running specialized software written specifically for the purposes described in this patent application. Wireless access points typically emit an identifier called a Service Set Identifier (SSID) which can be read by other Wi-Fi enabled devices. This system converts traditional Wireless Access Points and SSIDs for use as Emitting Stations 102. The corresponding software allows the Emitting Station 102 to accept commands from a Controlling Station 101 (over traditional communication methods). The Controlling Station 101 sends commands which will cause the Emitting Station 102 to change its SSID as directed.

While the Emitting Station 102 in the preferred embodiment of the current invention is a device capable of emitting a Wi-Fi signal, the inventor recognizes that there are a number of devices which are capable of wirelessly emitting a signal with a unique identifier which can be identified by the receiving station. Examples of other technologies which could be utilized as an emitting station 102 for the communication system of the present invention include, but are not limited to, Cellular Networks and short-wavelength UHF radio wave emitters. Additionally, the inventor recognizes that technology surrounding wireless communication is constantly evolving, and intends that this communication system could be adapted to work with developing technology which is capable of wirelessly emitting a signal with a unique identifier which can be identified by the receiving station The Mobile Receiving Device 103 is any device that is capable recognizing communication networks and is capable of running the corresponding application software. Examples of technologies which could be utilized as a Mobile Receiving Device 103 for the communication system of the present invention include, but are not limited to, mobile devices, such as a cell phone or tablet, or computers, both laptops and desktops, which can run the corresponding application software.

In traditional network communications, the user of the IEEE 802.11x (Wi-Fi) capable device must indicate a named network to join so that the device can begin negotiating with the network for a connection before communications can begin. The communication system of the current invention requires only the detection of the SSID by the Mobile Receiving Device 103. There is no need for the Mobile Receiving Device 103 to attach to the Emitting Station 102 or to any network device. There is also no need for the Mobile Receiving Device 103 to send any communication or acknowledgment back to the Emitting Station 102. Unlike a traditional Wi-Fi connection, the Emitting Station 102 does not need to determine if any Mobile Receiving Devices 103 are listening or not.

The number of Mobile Receiving Devices 102 is limited only by the number of devices that can be physically located within the broadcasting range of the Emitting Station 103.

This is a significant advantage over existing network models which are hampered by the number of simultaneous Wi-Fi connections that they can support. Each connection to a traditional Wi-Fi network degrades the performance of the network for all other connected devices. For example, most industrial grade Wi-Fi routers can support a maximum of two hundred and fifty simultaneously connected devices. Bandwidth limitations on a Wi-Fi router would make supporting that many connections impractical. Since this new method repurposes the Wi-Fi router as a broadcaster only, the same Wi-Fi router, when used as an Emitting Station 102, can manipulate thousands of devices at once with no degradation in performance.

The Emitting Station 102 can broadcast instructions and data to any Mobile Receiving Device 103 within range. The Mobile Receiving Device scans the available detected SSIDs for a pattern match. Once a match is detected, the entirety of the SSID is deciphered by the application software. The SSID name can contain data and instructions that are understood by the Mobile Receiving Device 103.

The Controlling Station 101 is any device capable of sending instructions that are interpreted by an Emitting Station. The Controlling Station 101 instructs the Emitting Station to change its SSID to a specified name on demand. The Controlling Station 101 is made up of software designed to encode data and commands into an SSID that will be transmitted through the Emitting Station 102 and recognized and decoded by the desired Mobile Receiving Device 103 in a specific place at a specific time.

For example, the Controlling Station 101 could send a software command via a traditional local area network (LAN) to an Emitting Station 102. The Emitting Station 102 would interpret the command and change its SSID as instructed.

Part of the SSID name is used by the Mobile Receiving Device 103 to establish a pattern match. For example, the Application Software 104 loaded on the Mobile Receiving Device 103 could be programmed to look for SSID's that begin with "MMSCOMMAND" or any other predetermined string. The Mobile Receiving Device 103 would ignore all SSID's that don't begin with the predetermined string.

The remaining SSID characters are then deciphered by the Mobile Receiving Device 103. The characters can be interpreted by the Application Software to execute functions and inject data. In a first embodiment, "MMSCOMMANDQ52TS122412U42" could be broken down as "MMSCOMMAND", "Q52", "T5122412" and "U42". "MMSCOMMAND" could cause the Application Software 104 to read the SSID and decipher the remaining characters. "Q52" could correspond to a preprogrammed set of instructions in the Application Software 104, such as an instruction to play a specific media file already loaded onto the Mobile Receiving Device 103. "T5122412" could be interpreted by the Mobile Receiving Device 103 as a timestamp corresponding to "12:24:12 AM".

The Application Software 104 could then execute a set of instructions triggered by the encoded SSID. In this example, the Mobile Receiving Device 103 might begin playing the "Q52" file from a designated timestamp by adding the difference between the current time and the encoded timestamp "12:24:12 AM". If the SSID is interpreted by the Mobile Receiving Device 103 at 12:24:32 AM, then the Q52 file would begin playing at the 20 second mark. This would allow a large number of Mobile Receiving Devices 103 to play synchronized content on demand without actually being connected to any type of network.

In a second embodiment of the invention the Application Software 104 can also keep track of all encoded SSID's that it detects and the time of the detection. In the prior SSID "MMSCOMMANDQ52TS122412U42," "U42" could be interpreted by the Mobile Receiving Device 103 as the location of the Emitting Station 102, for device tracking purposes That information can be shared later once the device attaches to a traditional network such as a cellular network or typical Wi-Fi network. This method allows for the tracking of devices to determine if and when the device was near a particular Emitting Station without requiring the device to pair with the Emitting Station 102 at the time.

For example, a live event which requires paid admission, could setup Emitting Stations 102 throughout the venue. As a patron with a Mobile Receiving Device 103 comes within range of an Emitting Station 102, the Application Software 103 will record the encounter and the timeframe of the encounter. Later, the record of the encounter can be used to prove that the device was indeed at the venue during the live event. This could be further exploited to determine if the Mobile Receiving Device 103 visited particular areas within the venue within a specified timeframe.

In a third embodiment of the invention the Application Software 104 can also display formatted text on the screen of the Mobile Receiving Device 103. This function can be used to transmit mass messages to all attendees in within range of an Emitting Station 102. It can be used enhance the event, such as providing updates when certain acts are about to start performing, or can be used as a safety device as well, alerting attendees of event issues, such as fires or terrorist attacks, and providing directions to the nearest exits. An SSID of "MMSCOMMANDF1S2C3BAND_X_IS STARTING_ON_STAGE_A" could be broken down as "MMSCOMMAND", "F1", "S2," "C3," and "BAND_X_IS STARTING_ON_STAGE_A". "MMSCOMMAND" could cause the Application Software 104 to read the SSID and decipher the remaining characters. "F1" could correspond to a preprogrammed set of instructions in the Application Software 104 to display a particular text font, "S2" could correspond to a preprogrammed set of instructions in the Application Software 104 to display a particular text size and "C3" could correspond to a preprogrammed set of instructions in the Application Software 104 to display a particular text color. The message "BAND X IS STARTING ON STAGE A" would then be displayed on the screen of the Mobile Receiving Device 103 in the specified font and size.

Referring to FIG. 5, an example of how the communication system of the current invention could be utilized. An event venue is constructed that will have two stages, Stage A 1 for Bands X, Y, & Z and stage B 2 with Bands M, N, & O with both stages simultaneously presenting. Emitting stations are located at each stage 1, 2. The emitting stations, are configured so that the range of the SSID transmitted 3 is limited to the area where attendees viewing Band Y or Band Z will be congregating.

In addition to Stages A & B, 1,2, a plurality of marketing tents 4, are erected between Stages A & B, 1,2. The marketing tents sell various goods or promote various activities. Each marketing tent 4 is provided with a emitting station configured so that the range of the SSID transmitted 5 is limited to the marketing tent 4.

Event promoters make the Application Software 104 available for download to attendees in advance of the event. The Application Software 104 includes preloaded presentations for the songs which will be played by Bands X, Y, Z, M, N, & O. Prior to arriving at the event venue, attendees will download and install Application Software 104 on their Mobile Receiving Devices 103.

Attendee arrives at the event, activates the Application Software 104 on her Mobile Phone and proceeds to Stage A 1 to watch Band X. Due to the vast number of attendee present at the event, attendees Mobile Receiving Device cannot communicate with her cellular network.

Band X begins to play song 1 at 1:00.00 PM, and the technician uses the Control Station 101 to instruct the Emitting Station 102 to broadcast the SSID "MMSCOMMANDBANDXSONG1TS130000". The attendee's mobile phone detects this SSID at 1:00:00 PM, and the Application Software 103 begins playing the pre-loaded presentation for song 1 from the beginning.

Band X begins to play song 2 at 1:05.05 PM, and the technician uses the Control Station 101 to instruct the Emitting Station 102 to broadcast the SSID MMSCOMMANDBANDXSONG1TS130505. The attendee's mobile phone detects this SSID at 1:05.12 PM, and the Application Software 104 begins playing the pre-loaded presentation for song 2 from the 00:07 mark. Attendee remains at Stage A 1 for the entirety of the set, and the Application Software 104 records all of the time that attendee was in range of the Emitting Station 102 3 for songs with "BANDX" in the SSID.

Attendee does not care for Band Y, who follows Band X, and proceeds to Stage B 2, to watch Band N. On the way to Stage B, attendee stops at 3 tents, each tent marketing a different product. Each time attendee enters a tent, her mobile phone detects the individual SSID for that tents and records all of the time that attendee was in range of the SSID transmitted 5 of the emitting station for each tent.

Attendee arrives at Stage B 1 to watch Band N at 2:15.45 PM. Band N is in the middle of playing song 4 which began to play song 1 at 2:12.00 PM. The emitting station is broadcasting the SSID "MMSCOMMANDBANDNSONG4TS141200". The attendee's Mobile Phone detects this SSID, and the Application Software 104 compares the internal clock of the mobile phone and recognizes that the presentation is in process, and starts playing the preloaded presentation at 3 min & 15 sec into the presentation for that file.

Once Band N completes their set, the attendee decides she does not care for either of the two remaining acts, Bands Z & O, and decides to leave. When she has traveled sufficiently far from the event, her Mobile Phone regains connection with her cellular providers and the Application Software 104 transmits the details of which bands she had watched and which tents she entered back to the event promoters server via the cellular network.

Event promoters can now use the information made available by Attendee as well as other attendees utilizing the application software to make decisions around which bands and marketing tents to utilize for future events.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method of communicating with mobile devices that are unable to connect with a wireless network connection at an event venue due to network congestion comprising:
    providing a software application to be uploaded to a mobile device to event attendees prior to the event, said software application configured to execute specific instructions when the device detects a wireless network with a specifically configured network identifier;
    erecting a plurality of emitting stations at the event venue and transmitting wireless network signals;
    configuring the wireless network signals so that attendee mobile devices can only detect network identifiers transmitted from the emitting stations and cannot establish a connection to the wireless network;
    using a controlling station to create unique network identifiers to be transmitted by the emitting stations that contain executable instructions that can be deciphered by the software application uploaded to the attendees mobile devices;
    activating the application software on the event attendees mobile devices when the attendees arrive at the venue;
    during the event, transmitting a first network identifier from the emitting stations configured with a first set of instructions for the software application installed on the mobile devices of the event attendees to execute which allows the event promoter to make a first communication with the attendees via their mobile devices;
    during the event, using the controlling station to change the first network identifier to a second network identifier from the emitting stations, where the second network identifier is configured with a second set of instructions for the software application installed on the mobile devices of the event attendees to execute which allows the event promoter to make a second communication with the attendees via their mobile devices.

2. The method of communicating with mobile devices that are unable to connect with a wireless network connection at an event venue of claim 1 wherein said mobile devices have presentation files loaded in the mobile devices prior to attending the event and said first and second network identifiers further comprise instructions for said application to access and display the presentation on the screen of the mobile devices.

3. The method of communicating with mobile devices that are unable to connect with a wireless network connection at an event venue of claim 1 wherein said network identifier further comprises an instruction detailing the location of the emitting station where the wireless signal is emitted from and said application logging the time which the mobile device is in range of the emitting station.

4. The method of communicating with mobile devices that are unable to connect with a wireless network connection at an event venue of claim 1 wherein said first and second network identifiers further comprise an instruction detailing text to be displayed on the screen of the mobile device from and said application displaying the desired text on the screen of the mobile device.

* * * * *